(No Model.)
C. H. HOLLISTER.
VESSEL FOR HEATING MILK OR OTHER FOOD FOR CALVES.
No. 463,387. Patented Nov. 17, 1891.
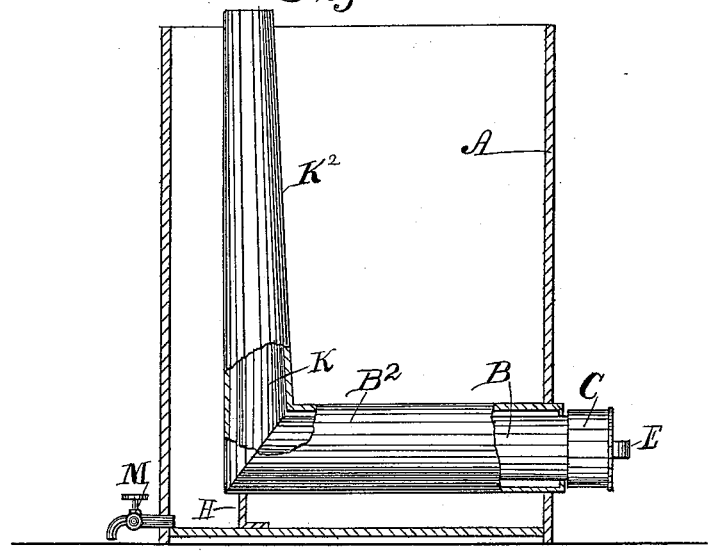
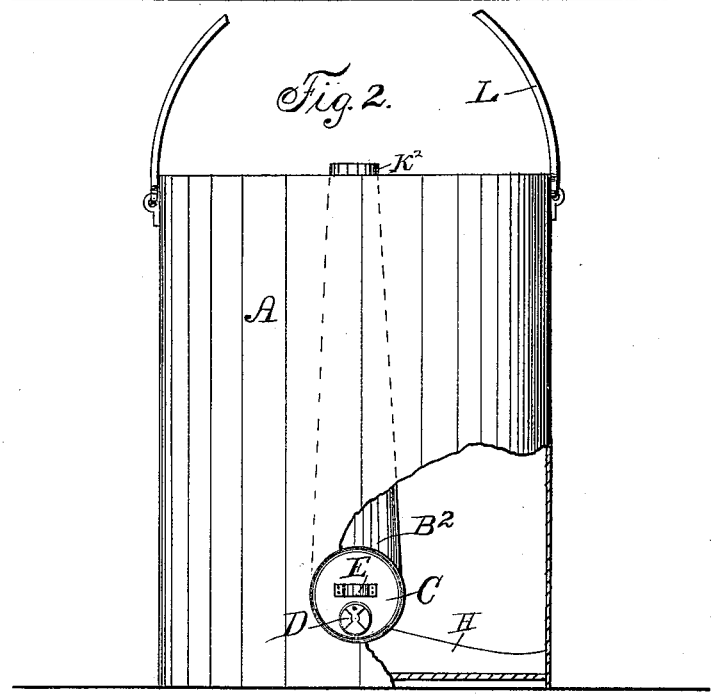

UNITED STATES PATENT OFFICE.

CHARLES H. HOLLISTER, OF CRESCO, IOWA.

VESSEL FOR HEATING MILK OR OTHER FOOD FOR CALVES.

SPECIFICATION forming part of Letters Patent No. 463,387, dated November 17, 1891.

Application filed July 2, 1890. Serial No. 357,476. (No model.)

*To all whom it may concern:*

Be it known that I, CHARLES H. HOLLISTER, a citizen of the United States, residing at Cresco, in the county of Howard and State of Iowa, have invented a new and useful Vessel for Heating Milk or other Food for Calves, of which the following is a specification.

The object of my invention is to provide a vessel that may be readily carried about, is adapted to be filled with milk or other fluid food, and is provided with means for warming and keeping warm the contents thereof without in any way injuring said contents by scorching or smoking.

My invention consists in the construction of a vessel and a fire-chamber or furnace so disposed within the vessel that the end into which the fuel is fed enters through the side of vessel and the flue will open to one side of the bail, so as not to burn the hand when it is being carried, and the said furnace and the flue thereof being provided with an outer shell or jacket separated a short distance from said furnace and flue and so fixed thereto as that water may be interposed between the jacket and furnace to prevent the contents of the vessel from being scorched.

Referring to the accompanying drawings, Figure 1 is a sectional side elevation of my device, a portion of the shell or jacket which surrounds the furnace and flue being broken away. Fig. 2 is a side elevation showing the front of the furnace, a portion of the vessel being broken away, revealing the support for the furnace on the interior thereof.

A represents a pail, preferably made of sheet metal, in the side of which at its lower portion is cut a circular opening.

B is a cylindrical fire-containing box or furnace, to which is fitted a cap C, provided with a register D and a handle E, the said cap being adapted for removal from the furnace B, which latter is surrounded by an outer shell or jacket $B^2$, fixed to said furnace in such a manner that water may be interposed in the space between the furnace and shell. The said furnace B is so disposed within the pail A as that one of its ends passes through and slightly beyond the opening in the side of the pail, and the flue is located to one side of the center of the pail. The outer end of the jacket $B^2$ is secured within the said opening in the side of the pail A, and the inner end thereof rests upon a metallic support H, which latter in turn rests upon and is secured to the bottom of the pail A. By extending the end of the casing $B^2$ through the side of the vessel A the water will prevent the heat from the fire-box burning the vessel when it is made of wood, or of heating it, when made of iron, so hot as to burn the milk.

K represents an exhaust and draft pipe for the escape of the waste products of combustion, fixed to the inner end of the fire-box, and has an outer shell or jacket $K^2$, fixed to the jacket $B^2$, which shell $K^2$ projects to the top portion of the pipe K, and is secured in a concentric position therewith in a suitable way to admit water to be poured between the pipe K and shell $K^2$ and the furnace B and jacket $B^2$ to prevent direct radiation of heat from the furnace to food surrounding it.

L represents a bail or handle attached to the vessel to be used to lift and carry the pail A, which is arranged centrally of the pail, so that when it is raised or held in its elevated position for carrying it will stand to one side of the upward draft of the flue, and will thus prevent the hand being burned by the heat from the flue.

M is a faucet for draining fluid from the vessel.

A vessel is thus produced that is adapted to warm and keep warm water or fluid food while it is carried about and used for distributing the food into troughs to feed calves and other animals for which warm drink or warm food is better than cold.

I am aware water-jackets for boilers and steamers are common; but my manner of combining a furnace and jacket with a pail or vessel adapted to be carried about by hand to facilitate the distribution of food in a warm condition is novel and greatly advantageous.

I claim as my invention—

A portable vessel for warming and carrying food for calves, consisting of an open-topped pail having a bail centrally located at its top and having a faucet at its bottom, a furnace within the pail, one end of which projects through the side near the bottom and is provided with a draft-flue at the opposite end, which extends above the top of the pail at one side of the center thereof, whereby the heat from the flue is at one side of the bail when in its raised or vertical position, a jacket surrounding the furnace and the flue, one end of which extends through the wall or side of the vessel and the other end extends to and concentrically surrounds the top of the flue, whereby water may be introduced at the top between the flue and the jacket and be retained around the furnace and the flue, a support on the bottom of the pail under the inner end of the jacket, and a removable cap over the end of the furnace that projects through the side of the pail, substantially as described.

CHARLES H. HOLLISTER.

Witnesses:
CHAS. KENDALL,
E. R. BUCKERIDGE.